United States Patent [19]
Ratzlaff et al.

[11] Patent Number: 5,228,280
[45] Date of Patent: Jul. 20, 1993

[54] ROUND BALER HAVING ANTI-WRAPPING CORE STARTER

[75] Inventors: Howard J. Ratzlaff, Hesston; Ferol S. Fell, Newton, both of Kans.

[73] Assignee: Hay & Forage Industries, Hesston, Kans.

[21] Appl. No.: 811,073

[22] Filed: Dec. 20, 1991

[51] Int. Cl.⁵ .............................. A01D 39/00
[52] U.S. Cl. ........................ 56/341; 100/88
[58] Field of Search ............... 56/341; 100/88, 89

[56] References Cited
U.S. PATENT DOCUMENTS

| | | | |
|---|---|---|---|
| 3,722,197 | 3/1973 | Vermeer | 56/341 |
| 4,182,101 | 1/1980 | Gaeddert | 56/341 |
| 4,633,659 | 1/1987 | Anstey et al. | 56/341 |
| 4,782,652 | 11/1988 | White | 56/341 |

Primary Examiner—David J. Bagnell
Attorney, Agent, or Firm—Hovey, Williams, Timmons & Collins

[57] ABSTRACT

A round baler with an open, non-compressive infeed region into its baling chamber has the bale core starter roller entrained by one end of a series of side-by-side conveyor belts so that the flat surfaces of the belts discourage loose crop materials from wrapping around the starter roller, without inhibiting the effectiveness of the starter roller as a means for imparting rotary driving force to the core during the early stages of bale formation.

14 Claims, 3 Drawing Sheets

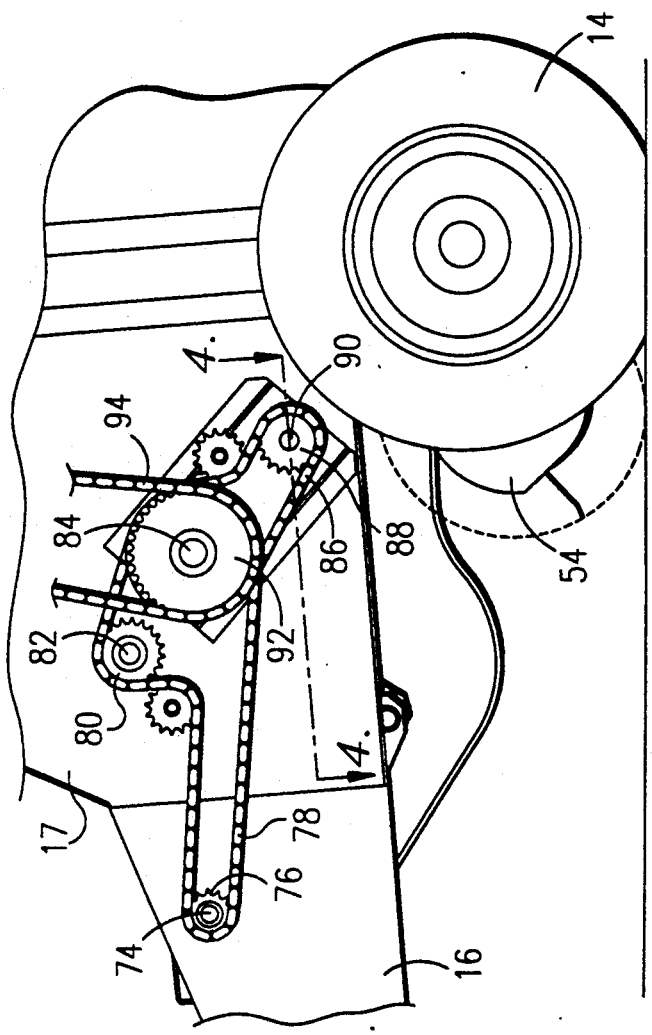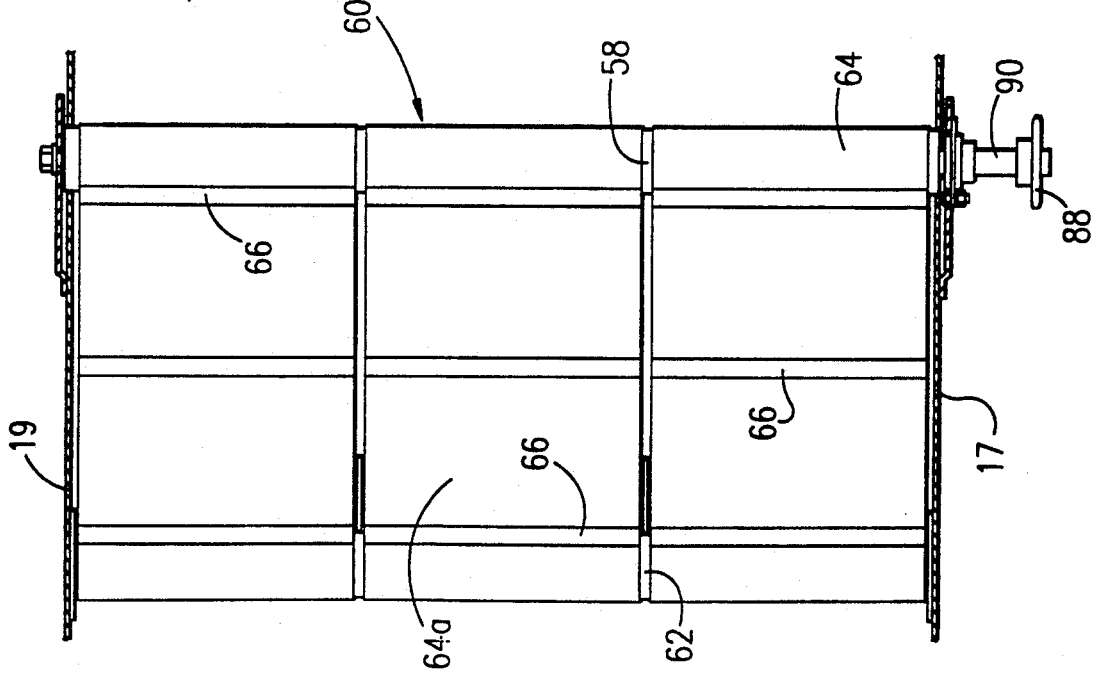

ROUND BALER HAVING ANTI-WRAPPING CORE STARTER

TECHNICAL FIELD

This invention relates to round balers and, more particularly, to mechanism for achieving more reliable starting of a bale core during each baling cycle while minimizing the tendency of crop materials to plug the machine and wrap around rotating components.

BACKGROUND

In a variable volume or expandable chamber baler, the baling operation can proceed relatively smoothly once the initial start up phase has passed and it is only necessary for the bale core to continue wrapping itself with additional layers of material as such materials are picked up and introduced into the baling chamber. The start up or core forming stage, however, can be troublesome, depending upon crop conditions, including the nature of the crop being baled and its moisture content. In some instances, the fresh crop material may not tumble properly within the empty chamber and may thus fail to form the coiled up core in the desired manner; in other instances, the crop material may plug up the infeed region of the baler and/or become wrapped around rotating parts so completely that the operation must be halted and the troublesome materials cleaned out of the machine.

It has been a common practice for many years to utilize a rotating starter roller within the infeed region of the baler to help give the newly arriving materials an extra measure of rotational driving force, thus encouraging them to tumble and coil up in the desired manner for starting the core. However, the presence of the starter roller within the infeed region presents one additional moving part on which stringy, especially high-moisture materials can become wrapped and plugged.

SUMMARY OF THE INVENTION

Accordingly, it is an important object of the present invention is to provide improvements in the infeed region of a rotary baler which retain the benefits of a bale starter roller without its drawbacks. In the process, it is an important object of the present invention to provide an improved baler having more reliable starting characteristics in a wider variety of crop conditions and types than has heretofore been possible.

In carrying out the foregoing, the present invention contemplates providing the starter roller with a moving, essentially flat surface at the top of the roller where contact is normally made with the bale core so that, instead of having a complete cylindrical surface around which the loose crop materials can wrap, the materials are instead confronted with a platform-like surface that simply presents no opportunity for wrapping. In a specific embodiment, the starter roller comprises an end roller of a conveyor assembly in which the roller is covered by the moving top stretch of an endless belt wrapped around the roller, the opposite end of the belt being wrapped around another transverse roller that is spaced a substantial distance forwardly out of the infeed region toward the front of the baler. Thus, although the starter roller can still function to transmit driving rotational force to the coiling materials within the baling chamber and to support some of the weight of the bale core and forming bale as the baling cycle progresses, the belt surfaces beside and around the roller prevent access to the roller itself by the crop materials. Thus, they are not permitted to wrap the roller and instead are conveyed on into the baling chamber where they belong.

Preferably, the conveyor extends in a generally horizontal manner out from the infeed region and below an upper and forward guide roll under which some of the bale forming belts of the machine are looped. Consequently, loose material that tends to be drawn downwardly toward the starter roller by a downwardly moving stretch of the belts around the guide roll is also denied access to the starter roller and is instead deposited on the upper, inwardly moving stretch of the conveyor to be delivered into the baling chamber. Other loose materials which are continuously discharged from areas of entrapment within the front portion of the baler by powered cleanout devices are likewise deposited on the inwardly moving stretch of the conveyor and delivered to the baling chamber in the desired manner.

BRIEF DESCRIPTION OF THE DRAWINGS

FIG. 3 is a fragmentary side elevational view of the lower left front portion of the baler illustrating components of the drive mechanism for rollers associated with the baling chamber;

FIG. 4 is a horizontal cross-sectional view of the conveyor associated with the bale starter roller of the machine and taken substantially along line 4—4 of FIG. 3.

DETAILED DESCRIPTION

Figure 1:
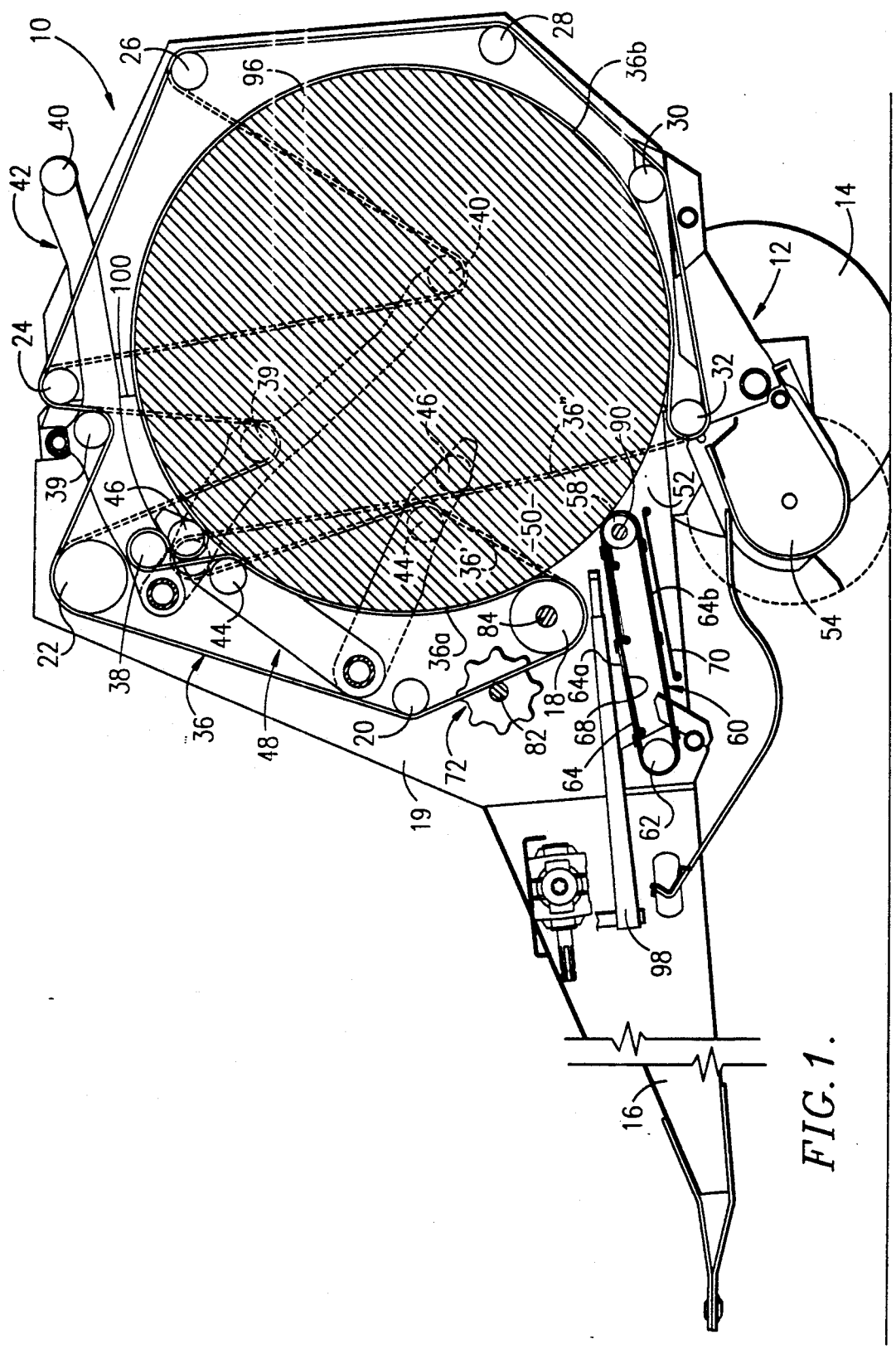
FIG. 1 is a vertical cross-sectional view of a round baler constructed in accordance with the principles of the present invention, the near sidewall of the machine being removed to reveal internal details of construction.

The round baler 10 selected for illustration includes a wheeled chassis 12 having ground wheels 14 and a forwardly extending tongue 16 that is adapted for connection with a towing vehicle (not shown). The chassis 12 carries a pair of upright, laterally spaced sidewalls 17 and 19 which cooperate to define a space within which bale forming and bale wrapping operations may be carried out as the baler is advanced across a field.

The variable chamber baler 10 includes a series of cooperating belts and rolls supported by the sidewalls 17, 19 for compacting and rolling the bale as it forms within the machine. In this respect, the baler 10 is provided with a plurality of stationary rolls 18, 20, 22, 24, 26, 28, 30, and 32 which span the sidewalls 17, 19 in a general circular pattern viewing FIG. 1 for guiding a plurality of endless, side-by-side belts 36 as the belts 36 are driven linearly during bale formation and wrapping. A set of three movable slack takeup rolls 38, 39, and 40 are mounted near the upper portion of the baler on downwardly spring biased arm structure 42 to maintain tension on the belts 36, yet permit the paying out of stored slack as the bale increases in diameter during formation. Near the fore-and-aft center of the baler 10, the belts 36 are looped under the roll 18, over the takeup roll 38, and under the lower roll 32 to present a pair of opposed, front and rear runs 36a and 36b which are initially generally upright, as illustrated in phantom in FIG. 1 and in solid lines in FIG. 2, but which become bowed out in fore-and-aft directions, as illustrated in solid lines in FIG. 1, as the bale grows beyond its initial starting core dimensions. A pair of retaining rolls 44 and 46 are mounted on a second swingable arm structure 48 that is also spring-biased downwardly toward the phantom line position in FIG. 1, the retaining rolls 44, 46 receiving the belt runs 36a and 36b therebetween so as to form a baling chamber 50 between the runs 36a, 36b which is bounded at the sides by the sidewalls 17, 19.

Figure 2:
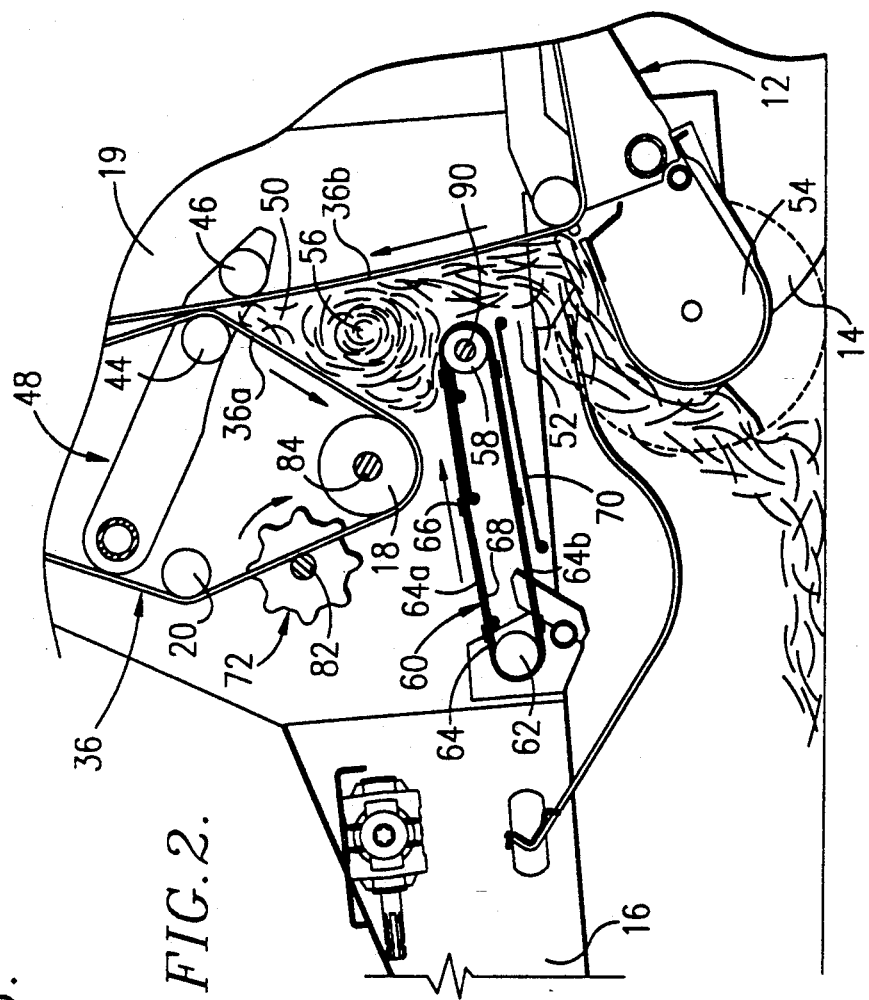
FIG. 2 is a fragmentary cross-sectional view similar to FIG. 1, but illustrating the manner in which a bale core is started in the machine.

Initially, the chamber 50 assumes a generally upright, somewhat triangular configuration, as shown in phantom lines in FIG. 1 and solid lines in FIG. 2, with the retaining rollers 44, 46 at the apex of the chamber 50. Thereafter, the chamber 50 becomes distended and circular in transverse configuration as the growing bale pushes forwardly on the belt run 36a and rearwardly on the belt run 36b to cause additional slack to be paid out when the arm 48 rises as additional hay is progressively added to the bale.

The chamber 50 is open at the bottom to present an infeed region 52 that is generally defined between the lower roll 32 and the upwardly and forwardly disposed roll 18. A pickup 54 supported generally below the infeed region 52 and forwardly adjacent the roll 32 is operable to lift crop material off the field as the baler 10 is advanced and to feed the material into the chamber 50 through the infeed region 52. Although not shown in the drawings, it will be understood that additional infeed means in the form of ribbed rollers or other devices between pickup 54 and roll 32 could be provided to assist the pickup 54 in feeding materials into chamber 50.

The roll 18 and the roll 22 are drive rolls for the belts 36 and are driven in clockwise directions viewing FIG. 1. Thus, when the baling chamber 50 is in its initial upright condition, as shown in FIG. 2, the front run 36a is moving generally downwardly and forwardly while the rear run 36b is moving generally upwardly and slightly forwardly. Consequently, hay introduced into the chamber 50 via the infeed region 52 is acted upon by the upwardly moving rear run 36b and the downwardly moving front run 36a so as to tumble forwardly and coil into a core 56.

Assisting in the formation of the core 56 is a transverse starter roller 58 in the infeed region 52 which forms part of a conveyor assembly 60 above the pickup 54 and below the roll 18. The starter roller 58 is in many respects similar to the bale positioning roller 134 shown in U.S. Pat. No. 4,182,101 assigned to the assignee of the present invention. However, whereas the starter roller 134 of U.S. Pat. No. 4,182,101 is isolated and alone within the infeed region of the baler, the starter roller 58 in the present invention has additional structure associated with it, i.e., the other components of the conveyor assembly 60, so as to keep the starter roller 58 from wrapping with crop material during operation.

As illustrated in the drawings, the starter roller 58 is positioned within the infeed region 52 approximately midway between the lower roll 32 and the upwardly and forwardly spaced roll 18. In this position, the starter roller 58 presents the inner or rear end of the conveyor assembly 60, while the opposite or front end of the conveyor assembly 60 is presented by a second transverse roller 62. Entraining the two rollers 58 and 62 is an endless web defined by three side-by-side, endless, flexible belts 64 as illustrated in FIG. 4, such belts 64 having an upper stretch 64a moving inwardly toward the infeed region 52 and a lower stretch 64b moving outwardly away from the infeed region 52, as illustrated in FIG. 2. Preferably, each of the belts 64 has a plurality of transverse slats 66 thereon which are positioned at equally spaced intervals along the length of the belt 64. Immediately below the upper stretch 64a of the belts 64 is a pan 68 (FIGS. 1 and 2) which extends in a fore-and-aft direction substantially the entire distance between the starter roller 58 and the front roller 62 while spanning the entire transverse width of the baler 10 for the purpose of catching residue and other trash materials that might fall between the belts 64 of the conveyor 60. A plate-like shield 70 underneath the lower stretch 64b of the belts 64 extends the full transverse width of the baler and prevents infeeding hay on the pickup 54 from coming into contact with the outwardly moving lower belt stretch 64b.

During the formation of a bale, a small amount of hay may be sloughed off the bale due to slippage between the belts 36 and the surface of the bale. Some of that residue tends to collect within the open area immediately above the roll 18 in front of the front belt run 36a. However, such accumulating material is immediately discharged from that area by the action of clean out discs broadly denoted by the numeral 72 in FIGS. 1 and 2 which protrude into the collecting area and have their protruding portions moving downwardly in a direction opposite to that of the upwardly moving belts 36 in the immediate vicinity. Such clean out discs 72 are the subject of co-pending application Ser. No. 07/626,973 filed Dec. 13, 1990, in the names of Howard J. Ratzlaff, et al., and assigned to the assignee of the present invention, now U.S. Pat. No. 5,097,760.

FIG. 3 illustrates the means by which drive roll 18, conveyor assembly 60, clean out discs 72 and starter roller 58 receive their driving power. It will be seen in this respect that input power to such mechanisms is provided by a jack shaft 74 situated at the rear of the tongue 16 which is connected through a drive line (not shown) to the power take off shaft of the towing vehicle. The jack shaft 74 carries a small sprocket 76 that is entrained by an endless, generally fore-and-aft extending chain 78. The chain 78 also wraps around a sprocket 80 on a shaft 82 of the clean out discs 72 and further entrains a large sprocket (not shown) carried by a stub shaft 84 of the drive roll 18. A second large sprocket (also not shown) on the stub shaft 84 is entrained by a second drive chain 86 that extends rearwardly from the stub shaft 84 to entrain a sprocket 88 on the outer end of a shaft 90 associated with the starter roller 58. On the outermost end of the stub shaft 84 is disposed a third large sprocket 92 which is entrained by a generally vertically extending endless drive chain 94 leading upwardly to the upper roll 22 for supplying driving power to the latter.

Figure 5:
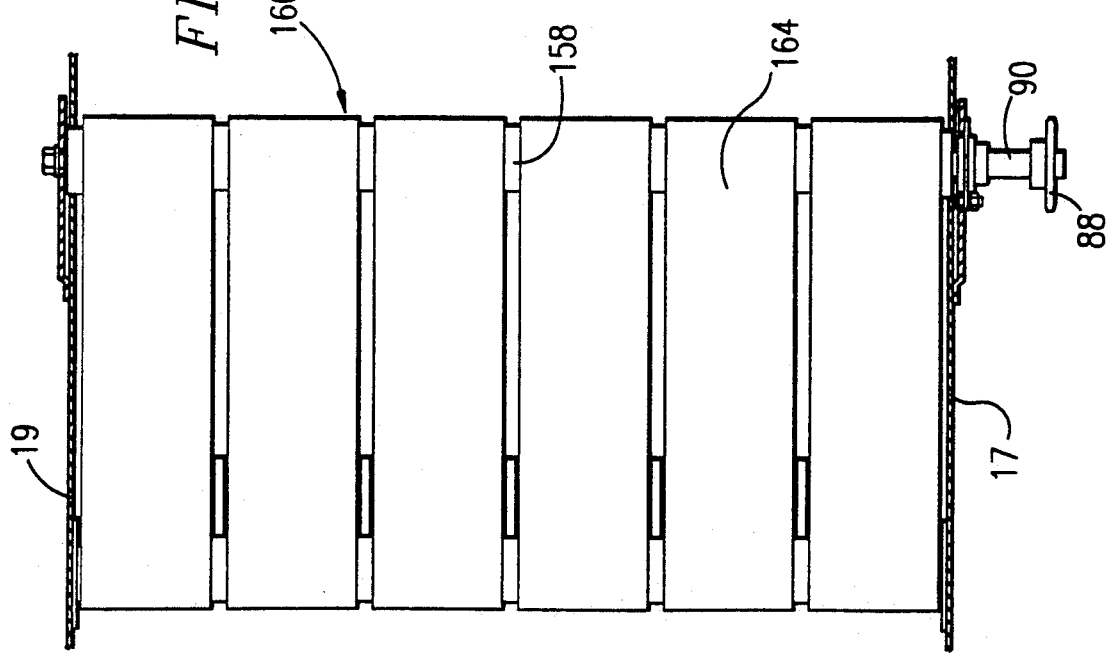
FIG. 5 is a horizontal cross-sectional view similar to FIG. 4, but showing a second embodiment of a conveyor associated with the starter roller.

FIG. 5 shows a second embodiment of the conveyor assembly, such second embodiment being noted by the numeral 160. The conveyor 160 is identical in all respects to the conveyor 60, except that the belts 164 of conveyor 160 do not have cross slats, as in the first embodiment, and the belts 164 are narrower and more numerous than the belts 64. The starter roller 158 of the conveyor assembly 160 is identical to the starter roller 58 of the first embodiment.

Operation

At the beginning of the baling cycle, as illustrated in FIG. 2, the incoming crop materials are engaged by the upwardly moving belt stretch 36b and the downwardly moving front belt stretch 36a and are caused to coil and tumble within the baling chamber 50. The core 56 which results from this action tends to rest upon the inner end of the conveyor assembly 60, and because the starter roller 58 is rotating in a clockwise direction, the inner end of the conveyor 60 helps impart a coiling action to the core 56 at this time. Thus, the advantages of having a rotary core starter are retained in the present invention.

However, it will be seen that the disadvantageous tendency for prior starter rollers to wrap with materials is avoided in the present invention due to the presence of the upper, generally planar surface presented by the upper stretch 64a of the belts 64 associated with the conveyor assembly 60. Inasmuch as the upper belt stretch 64a approaches the periphery of the starter roller 58 in a tangential manner along the top thereof, there is no opportunity for the loose strands of hay to wedge down between the starter roller 58 and the drive roll 18. Instead, access to that area is denied by the upper belt stretch 64a. Moreover, any material that does come to rest on the upper belt stretch 64a is immediately conveyed into the baling chamber 50 to be added to the rest of the core 56.

As the bale grows larger and the belt stretches 36a and 36b are deflected away from their upright positions of FIG. 2, the incoming crop materials flow more directly rearwardly into a nip formed at the bottom of the bale with the underlying bottom roll 32. A representation of a full size bale is denoted by cross hatching in FIG. 1 and is designated by the numeral 96. It will be seen that the incoming hay is thus no longer presented up into the area above the starter roller 58 where it has a tendency to attempt to wrap on the roller 58 during the early stages of bale formation. Thus, to a certain extent, the conveyor 60 is of less importance in the latter stages of bale growth than in the initial core starting stage thereof. On the other hand, it will also be appreciated that because the upper stretch 64a of the conveyor assembly 60 projects forwardly beyond the drive roll 18, and particularly beyond the clean out discs 72, any stray material that is cleaned out of the accumulating area above the roll 18 will fall onto the upper belt stretch 64a and be fed directly into the chamber 50 for addition to the forming bale. Thus, even in the later stages of bale growth, the conveyor 60 and the starter roller 58 have a significant role to play.

Once the bale 96 is fully formed, it may be tightly wrapped with either twine or a web-type wrapping material, such as a net material currently available from Exxon Chemical Company under the trade designation "Bale Lok" net wrap. A swingable twine dispensing tube 98 is also provided adjacent the front of the baler and projecting rearwardly into the space between the conveyor assembly 60 and the drive roll 18 for dispensing a supply of twine to the bale 96 in the event twine is desired as a wrapping material instead of the net wrap. If the net wrap is to be utilized, the baler 10 may be provided with a suitable net wrap attachment (not shown). One such suitable net wrap attachment is disclosed in co-pending application Ser. No. 07/772,238, filed Oct. 7, 1991, in the names of Ratzlaff, et al., assigned to the assignee of the present invention. After the bale is fully wrapped with either string or web material, the rear section of the machine along a parting line 100 may be swung upwardly and rearwardly to open the bale chamber and discharge the finished bale.

Reference is hereby made to applications filed concurrently with the present application and concerning the handling of stray crop materials and residue in round balers. Ser. No. 07/811,017 in the name of J. Dale Anderson, entitled "Residue Reducing Belt Roller Construction for Round Balers", relates to a round baler which utilizes an improved belt roller construction to reduce trash accumulation on the belt roller, while Ser. No. 07/811,076 (now U.S. Pat. No. 5,165,333) in the names of Howard J. Ratzlaff, et al., entitled "Round Baler Having Anti-Wrapping Idler Rolls", relates to a round baler provided with idler rolls that cause slight speed differential between different belts on the same idler roll so as to provide a self-cleaning action. The inventions of these two above-identified applications form no part of the invention claimed in the present application and are identified solely for purposes of providing full disclosure of generally related subject matters.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a round baler having a crop infeed region and means for forming a bale core adjacent said region at the commencement of each bale forming cycle, said region having crop infeed mechanism at a lower extremity thereof and a transverse roll spaced generally above said mechanism, the improvement comprising:
   an elongated conveyor projecting into said region above said infeed mechanism and below said roll for assisting in the formation of each bale core,
   said conveyor including a first transverse roller positioned to impart a rotary driving force to the core as crop material is coiled into a bale,
   said conveyor further including a second transverse roller spaced outwardly from said first roller in a direction away from said core forming means, an endless web entrained around said rollers, and means for driving the web in such a direction that an upper stretch thereof moves inwardly toward the first roller from the second roller.

2. In a round baler as claimed in claim 1,
   said bale core forming means including means presenting an upwardly moving surface spaced inwardly from an inner end of said conveyor defined by said first transverse roller, and a downwardly moving surface located above said conveyor and directed toward said upper stretch of the conveyor web, said upwardly moving surface and said downwardly moving surface being adapted to impart a tumbling action to crop material being formed into a bale core.

3. In a round baler as claimed in claim 2, said upwardly moving surface being presented by a first flexible belt run.

4. In a round baler as claimed in claim 3, said downwardly moving surface being presented by a second flexible belt run.

5. In a round baler as claimed in claim 4, said first and second belt runs comprising different portions of a single set of endless belts.

6. In a round baler as claimed in claim 1, said infeed mechanism including a crop pickup for lifting crop materials off the ground and feeding the same upwardly and rearwardly as the baler advances, said bale core forming means including a lower transverse guide roll rearwardly adjacent said pickup and an upwardly moving stretch of a plurality of side-by-side, flexible belts looped under said lower roll and extending upwardly therefrom for receiving crop materials from the pickup and imparting a lifting and coiling action thereto, said first roller of the conveyor being located above the pickup and spaced forwardly from said upwardly moving stretch of the flexible belts.

7. In a round baler as claimed in claim 1, said web of the conveyor being comprised of a plurality of endless, side-by-side, flexible belts.

8. In a round baler as claimed in claim 7, each of said belts having a series of transverse slats thereon.

9. In a round baler as claimed in claim 1, said web having a lower stretch that moves outwardly away from the first roller toward the second roller, there being a shield between said lower stretch of the conveyor web and the crop infeed mechanism for preventing engagement of the infeeding crop with the lower stretch of the conveyor web.

10. In a round baler as claimed in claim 1, said core forming means including endless flexible belts having portions looped under said transverse roll above the infeed mechanism and presenting a zone above the transverse roll in which stray crop materials may accumulate, said conveyor projecting outwardly beyond said transverse roll for such a distance that said upper stretch of the conveyor web may catch stray crop materials gravitating from said zone above the transverse roll and deliver the stray material to the forming bale core.

11. In a round baler, the improvement comprising: means defining an expandable baling chamber including a plurality of transverse, parallel guide rolls and side-by-side lengths of endless, flexible belts looped around said guide rolls, said baling chamber at the beginning of a baling cycle including a generally upwardly moving rear run of the belts and a generally downwardly moving front run of the belts for imparting a forward tumbling and coiling action to crop materials introduced into the baling chamber to produce a bale core, said front run of the belts looped under a front one of said transverse guide rolls and said rear run of the belts being looped under a rear one of said transverse guide rolls, said front guide roll being spaced upwardly and forwardly from said rear guide roll to present an open infeed region between the front and rear rolls for accepting crop materials into the baling chamber;

a pickup forwardly adjacent said rear guide roll in position for lifting crop materials off the ground as the baler is advanced and feeding the materials through the infeed region into the baling chamber;

a transverse starter roller within said infeed region forwardly of said rear belt run and rearwardly of and below said front guide roll for assisting in the formation of a bale core within the chamber, said starter roller being rotatable in a direction opposite to the direction of rotation of the core as it is formed within the baling chamber; and means defining a generally planar surface in generally tangential relationship with an upper extremity of the starter roller and extending forwardly therefrom beneath the front guide roll in a non-rotating flat plane, said generally planar surface being movable within said flat plane toward the baling chamber for preventing wrapping of the starting roller with crop materials during formation of the bale core.

12. In a round baler as claimed in claim 11, said planar surface defining means including an upper stretch of an endless web forming a part of a conveyor assembly, said web being looped around said starter roller at an inner, rear end of the conveyor assembly and around a second transverse roller at an outer, forward end of the conveyor assembly.

13. In a round baler as claimed in claim 12, said endless web comprising a series of endless belts disposed in side-by-side relationship on said starter roller and said second transverse roller.

14. In a round baler as claimed in claim 12, said conveyor assembly having a lower belt stretch moving from the starter roller toward said second transverse roller, there being a shield beneath the lower belt stretch for preventing engagement of infeeding crop materials with the lower stretch of the conveyor assembly.

* * * * *